2,044,372

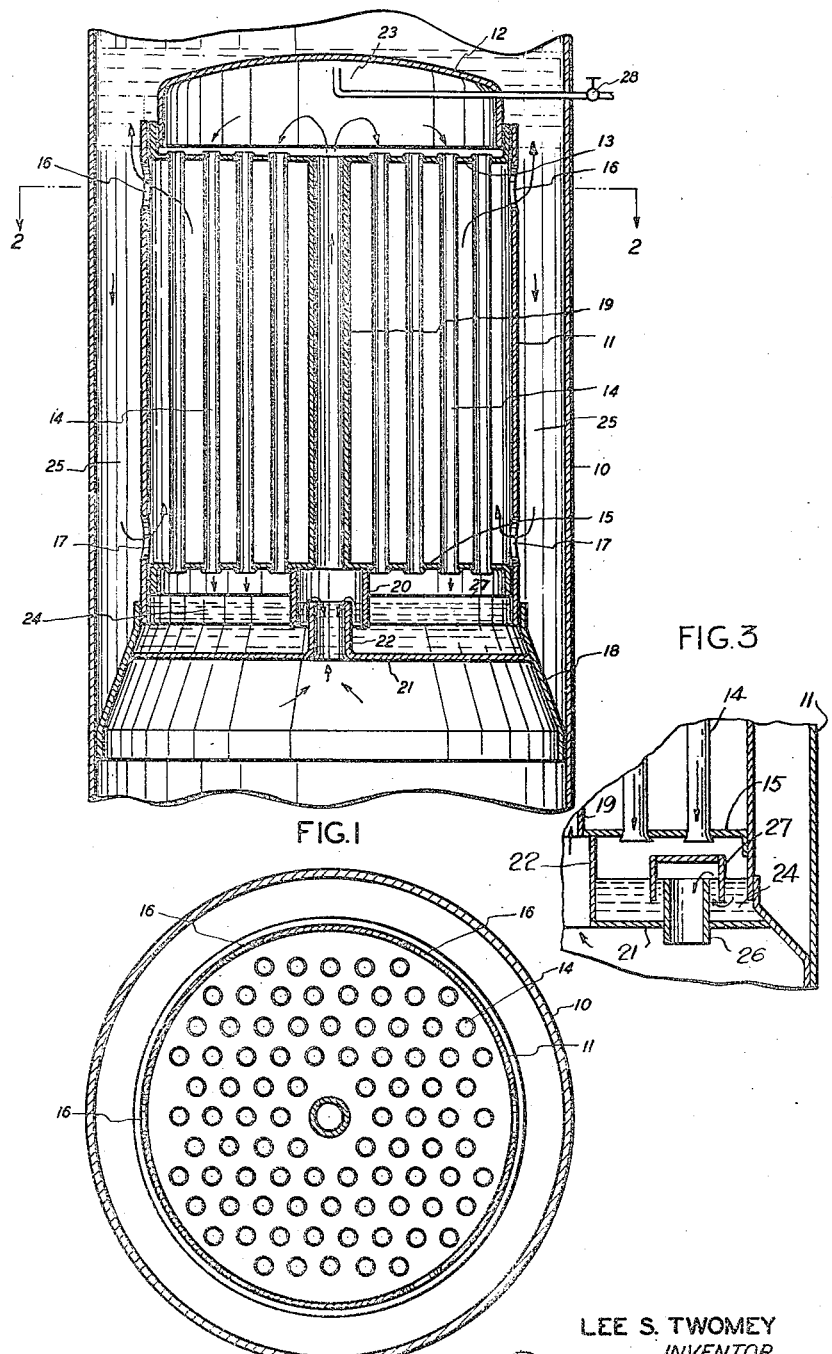
June 16, 1936.  L. S. TWOMEY  2,044,372
REBOILER AND CONDENSER
Filed Oct. 26, 1934
LEE S. TWOMEY
INVENTOR
ATTORNEY Patented June 16, 1936

UNITED STATES PATENT OFFICE 2,044,372

REBOILER AND CONDENSER

Lee S. Twomey, Vista, Calif.

Application October 26, 1934, Serial No. 750,165

8 Claims. (Cl. 257—226)

An object of my invention is to provide a vertical condenser for use in situations where the vapor to be condensed must be supplied from below and in which the course of the vapor through the tubes is downward instead of upward as it would be in ordinary vertical condensers so supplied.

An object of my invention is to provide an improved condenser of the submerged type for use in producing reflux liquid in a fractionating column.

An object of my invention is to provide a condenser of the submerged type for use in situations where a vapor at relatively high pressure is condensed in imparting heat to a liquid maintained at a relatively low pressure.

In the fractionation of liquefied gases, for example, it is often advantageous to use a single column divided into two sections a high pressure fractionation being effected in the bottom section and a fractionation at a materially lower pressure in the top section. In such columns it is necessary to reboil all or part of the liquid which condenses in the upper section and collects in a pool in the bottom of this section, and it is often highly advantageous to accomplish this reheating and evaporation on the low pressure side by means of heat liberated in condensing vapors otherwise evolved on the high pressure side, thus supplying reflux liquid for the high pressure section.

An object of my invention is to provide a heater and condenser for this and similar purposes which may be placed in or used to replace the partition wall between the two sections, and which is reinforced to prevent strain on the tubes and tube sheets, and which is provided with means for ensuring circulation of liquid around and of vapor through the tubes.

The condenser described may also be placed in the upper end of any fractionating column and provided with a controlled supply of cooling fluid directed to the space around the tubes. It may also be used as a reboiling or heating unit by submerging it in any body of liquid and supplying it with steam or other condensable heating fluid.

The structure may best be described in connection with the attached drawing, in which:

Figure 1 is a vertical section through a medial portion of a double fractionating column and through the reheating and condensing structure, Figure 2 is a cross-section on the line 2—2 of Figure 1, and Fig. 3 is a fragmental view of a portion of the column showing alternative forms of vapor conductor and condensate withdrawal means.

Referring to Figs. 1 and 2, 10 is a shell which may be a section of the shell of a fractionating column, 11 is the shell of the condenser itself, 12 the condenser head, 13 the upper tube sheet, 14—14 the condenser tubes and 15 the lower tube sheet. Shell 11 is provided with a plurality of openings 16—16 near the upper tube sheet and a plurality of openings 17—17 near the lower tube sheet, and also with a flaring skirt 18 by which it is made fast to shell 10.

A central vapor tube 19 having sufficient cross-sectional area to supply the condensing requirement of the tubes, is extended between and made fast to the tube sheets. Around the lower end of this tube a ring 20 is projected downwardly from the lower tube sheet. A plate 21 is horizontally attached to the interior of the skirt and from this plate a short tube 22 is projected upwardly within ring 20.

The space below plate 21 being illustrated as the upper end of a fractionating column which is normally filled with vapor, this vapor passes upwardly through tube 22 and tube 19 into the upper chamber 23, from which it passes downwardly into the tubes 14 in which it is condensed. The condensate flowing from the lower ends of the tubes forms a liquid pool 24 into which ring 20 dips to form a seal preventing the upward passage of vapor into the tubes 14.

The space surrounding the tubes and both within and without shell 11 is filled either with liquid condensed in the upper portion of shell 10 or with an externally supplied cooling medium. This liquid flows downwardly through the annular space 25 between shells 10 and 11 and enters the lower openings 17, thereby keeping the tubes submerged. Any vapor evolved in the heating of this liquid by the tubes 14 passes through the upper openings 16 into the upper part of shell 10. By reason of the circumferentially spaced relation of openings 16 (see Figure 2) even a strong flow of vapor from these openings will not prevent the free downward passage of liquid to openings 17.

The provision of shell 11 with openings as at 16 and 17 is highly advantageous, not only in promoting liquid circulation but also in affording a rigid spacing and support for the tube sheets, which are thus restrained from deflecting and tearing away from the tube ends when there is a material difference between the pressures on the two sides of the condenser. An obvious and equivalent modification of the perforations shown would be slots extending from top to bottom of the sheets, or a circumferential succession of spaced vertical bars joining and spacing the tube sheets.

The joints between skirt 18 and shells 10 and 11, the joints between shell 11 and tube sheets 13 and 15, and the joint between tube sheet 13 and head 12, are all made of sufficient strength to carry the desired pressure without leakage, as by riveting and calking, by welding, by brazing or by soldering, according to the size of the apparatus, the material of which it is constructed, and the temperature and pressure which it is to carry.

The condensate collecting in pool 24 may overflow the upper end of tube 22 and thus return to the portion of the column below plate 21, or a separate downspout may be provided, either inside or outside the column, having a seal to prevent the upward passage of vapor. If desired the condensate may be diverted to any point other than the lower section of the column.

Referring now to Fig. 3, the upcast tube 22 is lengthened to an attachment with the lower tube sheet 15 at such point as to afford a passage for vapor from below the plate 21 into tube 19. In this form drainage from the pool collecting on the plate is afforded by a nozzle 26 projected upwardly from the plate and surmounted by a cap 27, the lower edge of which dips below the surface of the pool 24 retained by the nozzle.

The combination of upcast pipe 19 and liquid seal 24, by which concurrent flow of vapor and condensate through the tubes is produced, may be used independently of the reinforcing shell 11 by which distortion of the tube sheets is prevented. In this case the tube sheets 13 and 15 and the head 12 may be fitted directly to the column shell, passages being arranged between the space above the head and the space around the tubes to permit submergence of the tubes in liquid condensing in the upper part of the column and to allow for the upward flow of vapors evolved from the tubes.

Likewise, when the condenser with seal and upcast tube is placed in the upper end of a column for the sole purpose of providing reflux the upper head of the column may be utilized as head 12 and the tube sheets made fast to the column wall, provision being made for introducing water into the space surrounding the tubes.

Per contra, a ring structure such as is provided by shell 11 may desirably be utilized in connection with any condenser having a tube sheet and head situated within an enclosing shell and which is subjected to either internal or external pressure, and may be so used either with or without the seal and upcast tube.

The valved vent indicated at 28 in the drawing is a conventional means for removing incondensable gases from the vapor space 23, and is not claimed.

The structure herein described is advantageous over vertical condensers in which the vapors enter the lower ends of the tubes in that the tubes may be reduced in diameter by reason of the concurrent flow. This reduction in diameter permits the placing of unit tube wall area in a smaller cross section, or the insertion of a greater tube area in a given section. Concurrent flow also produces a materially cooler condensate as the latter is not heated by counterflow against entering vapors, and desirably increases the heat transmission rate from vapor to tube wall under any given temperature head.

I claim as my invention:

1. A heating and condensing unit comprising: a bundle of vertically arranged condensing tubes; upper and lower tube sheets; a head defining an enclosure of space above said upper tube sheet; a vapor tube extended between said tube sheets and communicating with a source of vapor supply; means for collecting liquid condensed in said tubes and for returning said liquid to said source of vapor supply, said means including a liquid seal arranged to prevent the upward passage of vapor into said tubes; a shell arranged to permit said tubes to be submerged in a cooling fluid.

2. A structure substantially as and for the purpose set forth in claim 1, in which said collecting and returning means includes a tray nonleakably attached to the periphery of said lower tube sheet, a nozzle upwardly projected from said tray and communicating at its lower end with said source of vapor supply, and a ring projected downwardly from said lower tube sheet surrounding said nozzle and communicating with said vapor tube, said ring being spaced from said nozzle and from said tray.

3. A structure substantially as and for the purpose set forth in claim 1, in which said collecting and returning means includes a collecting pan nonleakably attached to the periphery of said lower tube sheet and a liquid sealed drain for condensate affixed to said tray.

4. In a vapor fractionating column, a condenser comprising: a bundle of vertically arranged condensing tubes; upper and lower tube sheets; a head defining an enclosure of space above said upper tube sheet; means for nonleakably attaching said lower tube sheet to the wall of said column, said wall being upwardly projected to retain a liquid body submerging said tubes; a vapor tube extended between said tube sheets and communicating with the portion of said column below said lower tube sheet; means for collecting liquid condensed in said tubes and for returning said liquid into the portion of said column below said lower tube sheet, said means including a liquid seal arranged to prevent the upward passage of vapor into said tubes.

5. A structure substantially as and for the purpose set forth in claim 4, in which said collecting and returning means includes a tray nonleakably attached to the periphery of said lower tube sheet, a nozzle upwardly projected from said tray and communicating at its lower end with said source of vapor supply, and a ring projected downwardly from said lower tube sheet surrounding said nozzle and communicating with said vapor tube, said ring being spaced from said nozzle and from said tray.

6. A structure substantially as and for the purpose set forth in claim 4, in which said collecting and returning means includes a collecting pan nonleakably attached to said lower tube sheet and a liquid sealed drain for condensate affixed to said tray.

7. A heating and condensing unit comprising: a bundle of vertically arranged condensing tubes; upper and lower tube sheets; a head defining an enclosure of space above said upper tube sheet; means for introducing a supply of vapor into said enclosure and for withdrawing condensate from below said tubes; a perforate metallic ring rigidly attached to and spacing said tube sheets; a vessel exterior to said ring and arranged to permit said tubes and said ring to be submerged in a cooling fluid.

8. In a vapor fractionating column, a condenser comprising: a bundle of vertically arranged condensing tubes; upper and lower tube sheets; a head defining an enclosure of space above said upper tube sheet; means for nonleakably attaching said lower tube sheet to the wall of said column, said wall being upwardly projected to provide a reservoir for liquid surrounding said tubes; a perforate metallic ring rigidly attached to and spacing said tube sheets, said ring being substantially spaced from the wall of said column.

LEE S. TWOMEY.